June 23, 1931.  G. E. BLAKE  1,811,816
TUBULAR BODY FOR HEATING OR THE LIKE AND METHOD OF MAKING THE SAME
Filed March 21, 1929
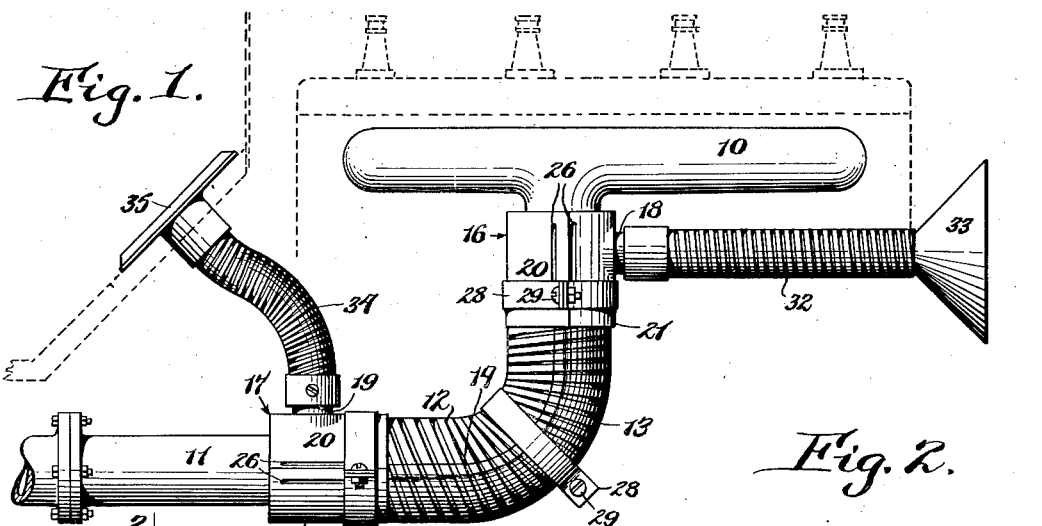
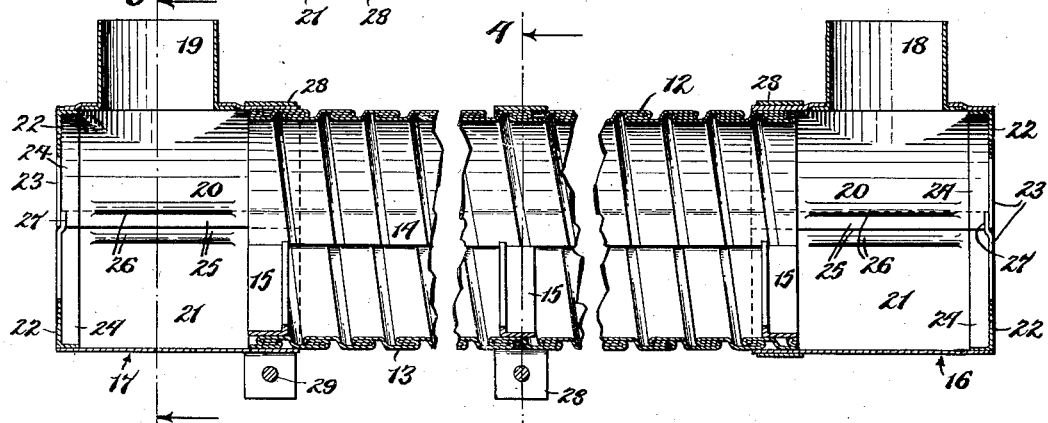
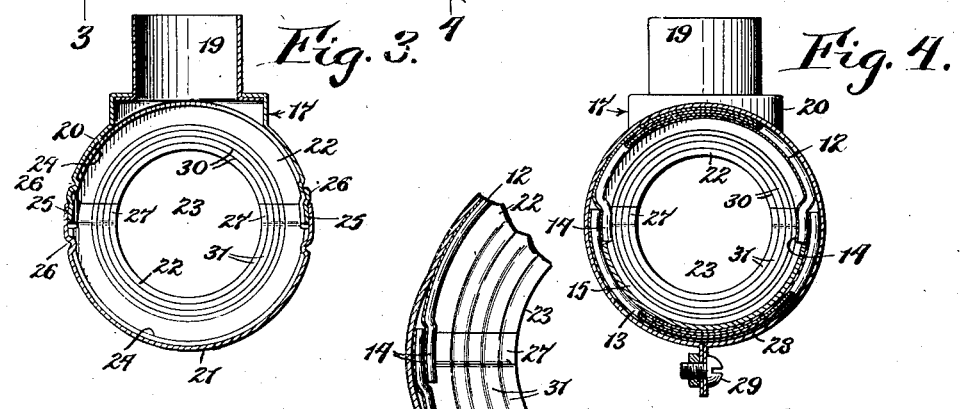
Inventor
George E. Blake
by Popp & Powers
Attorneys.

Patented June 23, 1931

1,811,816

UNITED STATES PATENT OFFICE

GEORGE E. BLAKE, OF EAST AURORA, NEW YORK, ASSIGNOR TO FORSYTH METAL GOODS COMPANY, INC., OF EAST AURORA, NEW YORK, A CORPORATION OF NEW YORK

TUBULAR BODY FOR HEATING OR THE LIKE AND METHOD OF MAKING THE SAME

Application filed March 21, 1929. Serial No. 348,798.

This invention relates to a heater and more particularly to an automobile exhaust heater in which the heat from the exhaust gases of the automobile engine is utilized for heating the interior of the car, although the invention can also be employed in other analogous uses.

The principal object of this invention is to provide a heater of this character which will adequately and efficiently heat the interior of the car and which is adjustable to fit all standard automobiles, and in which the heater can be applied without taking apart any of the engine connections and particularly the exhaust pipe on which the heater casing is adapted to be mounted.

A further object is to provide a heater of this character which can be applied to curves or bends in the exhaust pipe as readily as straight portions thereof, such bends or curves frequently occurring at the only convenient place where the heater can be installed.

A further purpose is to provide such a heater which can be installed quickly and readily and in which the adjustments required to fit the heater to different cars can be performed quickly and require no special skill.

Another aim is to provide a heater which when installed on the car will not be affected by the vibration to which automobile accessories are necessarily subjected and will operate to provide an abundant supply of hot air when needed.

Still further objects are to provide such a heater which is simple and inexpensive in construction and in which there is no danger of exhaust gases being conducted to the interior of the car by the stream of heated air.

In the accompanying drawings:

Fig. 1 is a side elevation of a heater embodying the present invention installed on the exhaust pipe of an automobile and showing the arrangement of the cold air inlet and the hot air outlet.

Fig. 2 is a longitudinal section through the heater casing or body, the inlet and outlet connections having been removed.

Figs. 3 and 4 are transverse sections taken on the correspondingly numbered lines in Fig. 2.

Fig. 5 is an enlarged fragmentary section similar to Fig. 4 showing a slightly modified form of the invention.

Similar reference numerals refer to similar parts in each of the figures of the drawings.

In its general organization this invention comprises a heater body composed of two half sections of a piece of flexible metal tubing, a separable head at each end of the tubing, the end heads being adapted to be fitted to an exhaust pipe, means for holding the several members together and in fixed relation to the exhaust pipe and cold air inlet and warm air outlet connections with the separable end heads.

In Fig. 1 is illustrated an automobile motor having the usual exhaust manifold 10 and exhaust pipe 11 leading from this manifold, the exhaust pipe being shown as having a curve where the heater is applied.

The body of the heater is composed of two sections 12 and 13 of flexible metal tubing. This tubing is fabricated in the usual manner from a strip of metal which is helically wound, the edges of the several turns of the strip being interlocked so that a substantially tight tube is provided and at the same time the tube is flexible, the interlocking being so effected as to permit the strips to slide relatively to one another and permit the tube to be flexed in any desired direction.

After being so fabricated the flexible metal tube is cut lengthwise so as to form the two sections 12 and 13, and the edges of one or both of the sections may be offset, as indicated at 14 in Figs. 4 and 5 so that upon joining these sections a tight joint is effected between them and the sections are prevented from collapsing. In addition to offsetting the edges of the flexible tube sections 12 and 13 half round angle pieces 15 can be welded or otherwise suitably secured to the channel section, the edges of the male section engaging the ends of these half round angle pieces when the two sections are brought together.

To the opposite ends of the flexible metal tube sections an inlet head 16 and an outlet head 17 are secured, the inlet head being provided with an inlet 18 and the outlet head being provided with an outlet 19. Inasmuch as these heads are alike in construction and mounting, the following description of one will be deemed to apply to both.

Each head is composed of two semi-cylindrical sections 20 and 21 which are made of sheet metal or the like, and to the end of each section 20 and 21 an end wall 22 is secured, each end wall 22 having a semi-circular opening 23. The end walls 22 are made of sheet metal of low tensile strength and are formed to provide an inwardly projecting semi-circular flange 24 which is welded to the corresponding head section 20 or 21. The two sections 20 and 21 together with the end walls 22 are adapted to be joined together and for this purpose the opposing edges of each section 20 and 21 are offset as indicated at 25 in Fig. 3 and are provided with corrugations 26 which limit the inward movement of the two sections. By this means one section, the section 20 is fitted within the other section, the corrugation 26 forming a stop for limiting the inward movement. The end wall 22 of the female section 21 is also preferably formed to provide inwardly offset portions 27 at its ends which are adapted to engage the inner sides of the ends of the end wall 22 of the male section 20 and provide a leak-tight joint at this place.

The inlet or outlet 18 or 19 can be secured to either of the sections 20 or 21 in any suitable manner and as shown an opening is provided in the section 20 and the end of the inlet or outlet is flanged and welded to the inside of the section.

In installing the heater as described the two flexible metal tube sections 12 and 13 are brought together around the part of the exhaust pipe to which the heater is to be applied and the end heads are then brought together so as to embrace the ends of the sections 12 and 13 of the flexible metal tube. The several sections are then clamped together by a plurality of straps 28, the ends of which are adapted to be drawn together by bolts 29. Preferably three of such straps 28 are provided, one embracing each end head and the other embracing the two sections of the flexible metal tube at the center of the heater.

To permit of the heads being fitted to exhaust pipes of different diameter, provision is made for permitting semi-circular pieces or strips to be readily chipped or torn out of each of the end head sections at its exhaust pipe opening, thereby enlarging this opening and adapting the heads to larger exhaust pipes. For this purpose each of the end walls 22 of each end head section is made of metal of low tensile strength and is provided on its inner and outer sides with a plurality of grooves or indentations 30 which are arranged concentrically with the exhaust pipe opening 23 as best shown in Figs. 3, 4 and 5. The corresponding indentations on opposite sides of each of the end walls 22 are equi-distant from the exhaust pipe opening and therefore form thin webs connecting relatively thick beads 31. The beads 31 of the corresponding walls 22 are registered with each other as best shown in Fig. 3 so that upon turning out or removing successive beads of both sections the circular shape of the exhaust opening will be maintained. In manufacturing the heater, the diameter or exhaust pipe opening provided in the walls 22 is made sufficiently small to fit the smallest size of exhaust pipe for which it is designed, and a table such as the following is preferably provided to aid the owner of the car or mechanic in determining how many semi-circular beads should be removed to fit any exhaust pipe:

For 1½" exhaust pipe use present hole;
For 1⅝" exhaust pipe remove 1 ring;
For 1¾" exhaust pipe remove 2 rings;
For 1⅞" exhaust pipe remove 3 rings;
For 2 1/16" exhaust pipe remove 4 rings;

The beads 31 are readily torn from the walls 22 by gripping the rings successively with a pair of pliers and tearing the web connecting it to the next bead.

The cold air inlet for the inlet connection for the heater as described and the hot air outlet may be of any suitable form and as shown, the cold air inlet connection comprises a flexible metal tube 32 which is connected to the cold air inlet 18 in any suitable manner and at its outer end is connected to a channel-shaped air collector 33. This collector 33 is preferably mounted adjacent the radiator of the automobile so that a part of the passing air is forced into the cold air inlet tube 32 and into the heater. In a similar manner a flexible metal hot air outlet conduit 34 is secured to the outlet 19 and at its other end is connected to a register 35 which discharges the hot air into the car body. It is apparent that the air passing through the heater is brought into intimate contact with the exhaust pipe which the heater surrounds and is therefore heated before being discharged through the register 35.

By employing two sections of flexible metal tube, as described, in combination with separable end heads it is obvious that the present heater can be applied to exhaust pipes without disconnecting or dismantling the exhaust pipe in any way, the several sections being merely brought together and clamped in place. It is also apparent that by employing sections composed of flexible metal tubing that the heater casing can be bent or turned into any desired form and that therefore the heater casing can be applied as easily to curves in the exhaust pipe as indicated in Fig. 1 as well as straight portions thereof. Also by offsetting the edges of the two flexible metal tube sections 12 and 13 a tight joint is obtained between these sections and this offsetting also tends to prevent the strips composing the flexible metal tube sections from coming apart.

This heater is also inexpensive and simple to construct and install, it can be quickly applied to all makes of cars and when applied is not liable to become loose or to lose its efficiency due to the severe vibration to which it is subjected.

I claim as my invention:

1. A method of making the body part of a heater which comprises cutting a piece of flexible metal tubing longitudinally from end to end to form two sections and forming the edges of said sections to provide an interfitting joint between the same.

2. A method of making flexible tubing which comprises forming a flexible tube, slitting said tube longitudinally from end to end on at least one side and forming at least one of the longitudinal edges of said tube at said slit to provide an interfitting longitudinal joint between said longitudinal edges formed by said slitting.

3. A method of making flexible tubing which comprises rolling at least one strip of metal into helical form and interlocking the adjacent edges of the convolutions of said strip, slitting the tube formed thereby at least on one side and from one end of said tube to the other and forming at least one of the longitudinal edges of said tube at said slit to provide an interfitting longitudinal joint between the longitudinal edges.

4. A method of making flexible metal tubing which comprises rolling at least one strip of metal into helical form, interlocking the adjacent edges of the convolutions of said strip, longitudinally slitting the tube formed thereby at one side and from one end of said tube to the other and forming the opposite side of the tube so that the edges of said tube at said slit can be readily brought toward and from one another.

5. A method of making flexible metal tubing which comprises rolling at least one strip of metal into helical form, interlocking the adjacent edges of the convolutions of said strip, longitudinally slitting the tube formed thereby at one side and from one end of said tube to the other, forming the opposite side of the tube so that the edges of said tube at said slit can be readily brought toward and from one another, and offsetting the longitudinal edges of said tube at said slit so that they overlap one another.

6. A method of making flexible metal tubing which comprises rolling at least one strip of metal into helical form, interlocking the adjacent edges of the convolutions of said strip, slitting the tube lengthwise to form two independent sections and offsetting the longitudinal edges of said sections whereby the said edges overlap one another.

7. An article of manufacture comprising a helically wound strip having the edges of its convolutions interlocked to form a flexible tubular body, said tubular body being slit end to end on at least one side whereby said tube can be opened up to receive an object and at least one of the longitudinal edges of said tube at said slit being offset to provide an interfitting engagement with the other longitudinal edge of said tube at said slit.

8. An article of manufacture comprising a helically wound strip having the edges of its convolutions interlocked to form a flexible tubular body, said tubular body being slit end to end on one side and the side of said tube opposite said slit being formed so that said tube can be readily opened up to receive an object.

9. An article of manufacture comprising a helically wound strip having the edges of its convolutions interlocked to form a flexible tubular body, said tubular body being slit end to end on one side and the side of said tube opposite said slit being formed so that said tube can be readily opened up to receive an object, and the edges of said tube at said slit being offset so that said edges form a tight joint when brought together.

10. An article of manufacture comprising a helically wound strip having the edges of its convolutions interlocked to form a flexible tubular body, said body being slit lengthwise end to end to provide two independent sections, and the longitudinal edges of said slits being offset whereby the edges of said sections overlap one another.

11. An article of manufacture comprising a helically wound strip having the edges of its convolutions interlocked to form a flexible tubular body, said body being slit lengthwise end to end to provide two independent sections, and the longitudinal edges of said slits being offset whereby the edges of said sections overlap one another, and means for holding said sections together.

In testimony whereof I hereby affix my signature.

GEORGE E. BLAKE.